(12) United States Patent
Tomita

(10) Patent No.: US 9,353,260 B2
(45) Date of Patent: May 31, 2016

(54) POLYCARBONATE RESIN COMPOSITION AND MOLDED ARTICLE

(71) Applicant: Mitsubishi Engineering-Plastics Corporation, Minato-ku (JP)

(72) Inventor: Keisuke Tomita, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 0 days.

(21) Appl. No.: 14/759,088

(22) PCT Filed: Feb. 6, 2014

(86) PCT No.: PCT/JP2014/052712
§ 371 (c)(1),
(2) Date: Jul. 2, 2015

(87) PCT Pub. No.: WO2014/171168
PCT Pub. Date: Oct. 23, 2014

(65) Prior Publication Data
US 2016/0024299 A1 Jan. 28, 2016

(30) Foreign Application Priority Data

Apr. 19, 2013 (JP) .................................. 2013-088188

(51) Int. Cl.
*C08L 69/00* (2006.01)
*C08K 5/42* (2006.01)
*C08K 5/521* (2006.01)
*C08L 51/04* (2006.01)
*C08K 5/00* (2006.01)

(52) U.S. Cl.
CPC . *C08L 69/00* (2013.01); *C08K 5/42* (2013.01); *C08K 5/0091* (2013.01); *C08K 5/521* (2013.01); *C08L 51/04* (2013.01); *C08L 2201/02* (2013.01); *C08L 2201/08* (2013.01)

(58) Field of Classification Search
CPC ...................................................... C08L 69/00
USPC ....................................................... 524/140
See application file for complete search history.

(56) References Cited

U.S. PATENT DOCUMENTS

| 5,013,776 A * | 5/1991 | Ishihata ................. C08K 5/521 524/117 |
| 5,234,979 A | 8/1993 | Toedtemann et al. |
| 7,015,261 B1 * | 3/2006 | Zerafati ................ C08F 265/04 523/201 |
| 2005/0009968 A1* | 1/2005 | Singh ...................... C08L 69/00 524/155 |
| 2012/0301766 A1* | 11/2012 | Monden .................. C08L 69/00 429/100 |
| 2014/0303296 A1 | 10/2014 | Inazawa et al. |

FOREIGN PATENT DOCUMENTS

| JP | S59-202240 A | 11/1984 |
| JP | S62-4746 A | 1/1987 |
| JP | 2007-099798 A | 4/2007 |
| JP | 2007-154173 A | 6/2007 |
| JP | 2008-280491 A | 11/2008 |
| JP | 2008-285507 A | 11/2008 |
| JP | 2009-007487 A | 1/2009 |
| JP | 2011-057888 A | 3/2011 |
| JP | 2012-126841 A | 7/2012 |
| JP | 4990417 B2 | 8/2012 |
| WO | WO 2013/081161 A1 | 6/2013 |

OTHER PUBLICATIONS

International Search Report issued Apr. 28, 2014, in PCT/JP2014/052712, filed Feb. 6, 2014.

* cited by examiner

*Primary Examiner* — Doris Lee
(74) *Attorney, Agent, or Firm* — Oblon, McClelland, Maier & Neustadt, L.L.P.

(57) ABSTRACT

A polycarbonate resin composition is provided, which exhibits a high flame retardancy, a high impact resistance, and an excellent thermal stability. The polycarbonate resin composition is characterized by containing, per 100 mass parts of (A) a polycarbonate resin, 0.001 to 1 mass part of (B) a metal organosulfonate salt and 0.5 to 5 mass parts of (C) a core/shell graft copolymer that has an Si content of at least 300 ppm and that has a butadienic rubber component for the core, and per 100 mass parts of the core/shell graft copolymer (C), 0.1 to 3 mass parts of (D) a metal salt of an organophosphate ester.

6 Claims, No Drawings

POLYCARBONATE RESIN COMPOSITION AND MOLDED ARTICLE

TECHNICAL FIELD

The present invention relates to a polycarbonate resin composition and to molded articles, more particularly relates to a polycarbonate resin composition that has a high flame retardancy, a high impact resistance, and an excellent thermal stability, and to molded articles obtained by molding such a polycarbonate resin composition.

BACKGROUND ART

Polycarbonate resins are resins that exhibit an excellent heat resistance, excellent mechanical properties, and excellent electrical properties and are thus widely used as, for example, automotive materials, materials for electric and electronic equipment, housing materials, and materials for manufacturing parts in other industrial fields. In particular, flame-retarded polycarbonate resin compositions are advantageously used for parts in, for example, office automation equipment and information processing equipment, e.g., computers, notebook personal computers, cell phones, printers, copiers, and so forth.

The incorporation of a halogen flame retardant into polycarbonate resin has heretofore been used as a means for providing polycarbonate resins with flame retardancy. However, polycarbonate resin compositions that incorporate a halogen flame retardant containing chlorine or bromine exhibit a reduced thermal stability and cause corrosion of a screw and molding tools of molding equipments during the molding process. Numerous polycarbonate resin compositions that incorporate a phosphorus flame retardant are therefore in use as an alternative means here (refer, for example, to Patent Documents 1 and 2).

This incorporation of a phosphorus flame retardant in polycarbonate resins is an approach that can effectively shorten the burning time by, for example, film formation by the phosphorus compound at the resin surface or a dilution effect on the combustion gases in the gas phase by the phosphorus compound. However, a problem here is the substantial reduction in the impact resistance natively possessed by polycarbonate resins. Due to this, formulations that additionally incorporate an elastomer have been pursued. The present applicant has made various proposals, as in Patent Documents 3 to 7, with regard to such polycarbonate resin compositions that incorporate a phosphorus flame retardant and an elastomer.

Thus, Patent Document 3 provides a polycarbonate resin composition for which the generation of white foreign material spots on the molding surface is suppressed; this is achieved by the incorporation into an aromatic polycarbonate resin of a phosphorus flame retardant and a special anti-dripping agent in the form of an organic polymer-coated polyfluoroethylene. Patent Document 4 provides a polycarbonate resin composition in which the following are incorporated in an aromatic polycarbonate resin: a phosphorus flame retardant, a polyfluoroethylene, and a polyorganosiloxane-containing graft copolymer in which first and second vinyl monomers are copolymerized in prescribed proportions. Patent Document 5 provides a polycarbonate resin composition in which a phosphorus flame retardant, a vinyl monomer-grafted silicone/acrylic composite rubber, and an anti-dripping agent are incorporated in an aromatic polycarbonate resin in prescribed proportions.

Patent Document 6 provides a polycarbonate resin composition in which talc is essential and the following are incorporated in specific proportions in an aromatic polycarbonate resin: a phosphorus flame retardant, polyfluoroethylene, and a polyorganosiloxane-containing graft copolymer obtained by the copolymerization of a first vinyl monomer, a second vinyl monomer, and a multifunctional vinyl monomer in specific proportions in the presence of a specific amount of polyorganosiloxane particles. Patent Document 7 provides a polycarbonate resin composition in which the following are incorporated in specific proportions in a polycarbonate resin: a phosphorus flame retardant; a fluoropolymer; a polymer having a multilayer structure of a crosslinked polyalkyl acrylate core and an alkyl (meth)acrylate polymer-type shell; titanium oxide; carbon black; and a dye or pigment.

Patent Document 1: Japanese Patent Application Laid-open No. S59-202240
Patent Document 2: Japanese Patent Application Laid-open No. S62-4746
Patent Document 3: Japanese Patent Application Laid-open No. 2007-154173
Patent Document 4: Japanese Patent Application Laid-open No. 2008-280491
Patent Document 5: Japanese Patent Application Laid-open No. 2009-7487
Patent Document 6: Japanese Patent Application Laid-open No. 2008-285507
Patent Document 7: Japanese Patent Application Laid-open No. 2011-57888

SUMMARY OF INVENTION

Technical Problem

However, there has been demand in recent years for higher performance levels, as is typical in sectors such as, for example, parts for electric and electronic equipment, and there is strong demand for an excellent thermal stability, a high impact resistance, and, with regard to flame retardancy, a high flame retardancy at the V-0 level according to the UL94 test. However, the resin compositions provided in each of the patent documents listed above have not been able to necessarily fully satisfy all of these demands.

The present invention was pursued in view of this problem and takes as an object the introduction of a polycarbonate resin composition that has a high flame retardancy, a high impact resistance, and an excellent thermal stability.

Solution to Problem

In order to solve the problem indicated above, the present inventor carried out extensive and intensive investigations and as a result discovered that a polycarbonate resin composition that simultaneously exhibits a high flame retardancy, a high impact resistance, and a high thermal stability is obtained by combining, in a specific amount for each, a metal organosulfonate salt flame retardant, a core/shell graft copolymer—used as an elastomer for combination with the metal organosulfonate salt flame retardant and using a core/shell graft copolymer having a butadienic rubber for the core and having a specific Si content —, and a metal salt of an organophosphate ester. The present invention was achieved based on this discovery.

The present invention provides the following polycarbonate resin compositions and molded article.

[1] A polycarbonate resin composition characterized by containing, per 100 mass parts of (A) a polycarbonate resin, 0.001 to 1 mass part of (B) a metal organosulfonate salt and 0.5 to 5 mass parts of (C) a core/shell graft copolymer that has an Si content of at least 300 ppm and that has a butadienic rubber component for the core, and per 100 mass parts of the core/shell graft copolymer (C), 0.1 to 3 mass parts of (D) a metal salt of an organophosphate ester.

[2] The polycarbonate resin composition according to [1], wherein the metal organosulfonate salt (B) is an alkali metal salt of a perfluoroalkanesulfonic acid or an alkali metal salt of an aromatic sulfonic acid.

[3] The polycarbonate resin composition according to [1] or [2], wherein the core/shell graft copolymer (C) is a graft copolymer obtained by graft polymerizing at least one alkyl (meth)acrylate on a butadienic rubber.

[4] The polycarbonate resin composition according to any one of [1] to [3], wherein the Si content of the core/shell graft copolymer (C) is at least 1,000 ppm.

[5] The polycarbonate resin composition according to any one of [1] to [4], wherein the Si content of the core/shell graft copolymer (C) is 1,000 to 10,000 ppm.

[6] A molded article obtained by molding the polycarbonate resin composition according to any one of [1] to [5].

Advantageous Effect of Invention

The polycarbonate resin composition of the present invention can provide—through the combination therein of (C) a core/shell graft copolymer that has an Si content of at least 300 ppm and that has a butadienic rubber component for the core, (B) a metal organosulfonate salt, and (D) a metal salt of an organophosphate ester in the specific amounts given above for each—a polycarbonate resin composition material that simultaneously satisfies the flame retardancy, impact resistance, and thermal stability.

DESCRIPTION OF EMBODIMENTS

The present invention is particularly described below through, inter alia, embodiments and illustrative material, but the present invention should not be construed as being limited to or by the embodiments and illustrative materials provided below.

The polycarbonate resin composition of the present invention is characterized by containing, per 100 mass parts of (A) a polycarbonate resin, 0.001 to 1 mass part of (B) a metal organosulfonate salt and 0.5 to 5 mass parts of (C) a core/shell graft copolymer that has an Si content of at least 300 ppm and that has a butadienic rubber component for the core, and per 100 mass parts of the core/shell graft copolymer (C), 0.1 to 3 mass parts of (D) a metal salt of an organophosphate ester.

[Polycarbonate Resin (A)]

There are no limitations on the species of polycarbonate resin used in the polycarbonate resin composition of the present invention.

In addition, a single species of polycarbonate resin may be used or any combination of two or more species in any proportions may be used.

Polycarbonate resins are polymers with a basic structure that has the carbonate bond and is given by the general formula —[—O—X—O—C(=O)—]—. X in the formula is generally a hydrocarbon group, and an X that incorporates a heteroatom or heterobond may be used in order to provide various properties.

The polycarbonate resins can be classified into aromatic polycarbonate resins, in which the carbons directly bonded to the carbonate bond are each aromatic carbons, and aliphatic polycarbonate resins, in which they are aliphatic carbons, and either can be used. Aromatic polycarbonate resins are preferred here from the standpoint of the heat resistance, mechanical properties, and electrical properties.

There are no limitations on the specific species of polycarbonate resin, and it can be exemplified by the polycarbonate polymers obtained by the reaction of a carbonate precursor with a dihydroxy compound. A polyhydroxy compound or the like may also be reacted here in addition to the dihydroxy compound and carbonate precursor. A method may also be used in which carbon dioxide is reacted as the carbonate precursor with a cyclic ether. The polycarbonate polymer may be straight chain or may be branched chain. The polycarbonate polymer may be a homopolymer composed of a single repeating unit or may be a copolymer having two or more repeating units. This copolymer can be selected from various copolymerization regimes, e.g., random copolymers, block copolymers, and so forth. These polycarbonate polymers are generally thermoplastic resins.

Among the monomers that are starting materials for aromatic polycarbonate resins, the aromatic dihydroxy compounds can be exemplified by the following:

dihydroxybenzenes such as 1,2-dihydroxybenzene, 1,3-dihydroxybenzene (i.e., resorcinol), and 1,4-dihydroxybenzene;

dihydroxybiphenyls such as 2,5-dihydroxybiphenyl, 2,2'-dihydroxybiphenyl, and 4,4'-dihydroxybiphenyl;

dihydroxynaphthalenes such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene, and 2,7-dihydroxynaphthalene;

dihydroxydiaryl ethers such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene, and 1,3-bis(4-hydroxyphenoxy)benzene;

bis(hydroxyaryl)alkanes such as 2,2-bis(4-hydroxyphenyl)propane (i.e., bisphenol A), 1,1-bis(4-hydroxyphenyl)propane, 2,2-bis(3-methyl-4-hydroxyphenyl)propane, 2,2-bis(3-methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(3,5-dimethyl-4-hydroxyphenyl)propane, 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,3-bis[2-(4-hydroxyphenyl)-2-propyl]benzene, bis(4-hydroxyphenyl)methane, bis(4-hydroxyphenyl)cyclohexylmethane, bis(4-hydroxyphenyl)phenylmethane, bis(4-hydroxyphenyl)(4-propenylphenyl)methane, bis(4-hydroxyphenyl)diphenylmethane, bis(4-hydroxyphenyl)naphthylmethane, 1,1-bis(4-hydroxyphenyl)ethane, 1,1-bis(4-hydroxyphenyl)-1-phenylethane, 1,1-bis(4-hydroxyphenyl)-1-naphthylethane, 1,1-bis(4-hydroxyphenyl)butane, 2,2-bis(4-hydroxyphenyl)butane, 2,2-bis(4-hydroxyphenyl)pentane, 1,1-bis(4-hydroxyphenyl)hexane, 2,2-bis(4-hydroxyphenyl)hexane, 1,1-bis(4-hydroxyphenyl)octane, 2,2-bis(4-hydroxyphenyl)octane, 1,1-bis(4-hydroxyphenyl)hexane, 2,2-bis(4-hydroxyphenyl)hexane, 4,4-bis(4-hydroxyphenyl)heptane, 2,2-bis(4-hydroxyphenyl)nonane, 1,1-bis(4-hydroxyphenyl)decane, and 1,1-bis(4-hydroxyphenyl)dodecane;

bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,3-dimethylcyclohexane, 1,1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butylcyclohexane, 1,1-bis(4-hydroxyphenyl)-3-phenylcyclohexane, and 1,1-bis(4-hydroxyphenyl)-4-phenylcyclohexane;

cardo structure-containing bisphenols such as 9,9-bis(4-hydroxyphenyl)fluorene and 9,9-bis(4-hydroxy-3-methylphenyl)fluorene;

dihydroxydiaryl sulfides such as 4,4'-dihydroxydiphenyl sulfide and 4,4'-dihydroxy-3,3'-dimethyldiphenyl sulfide;

dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone.

Among the preceding, the bis(hydroxyaryl)alkanes are preferred and among them the bis(4-hydroxyphenyl)alkanes are preferred, and 2,2-bis(4-hydroxyphenyl)propane (i.e., bisphenol A) is particularly preferred from the standpoints of the impact resistance and heat resistance.

A single aromatic dihydroxy compound may be used or any combination of two or more in any proportions may be used.

The monomers that are starting materials for aliphatic polycarbonate resins can be exemplified by the following: alkanediols such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol, and decane-1,10-diol;

cycloalkanediols such as cyclopentane-1,2-diol, cyclohexane-1,2-diol, cyclohexane-1,4-diol, 1,4-cyclohexanedimethanol, 4-(2-hydroxyethyl)cyclohexanol, and 2,2,4,4-tetramethylcyclobutane-1,3-diol;

glycols such as ethylene glycol, 2,2'-oxydiethanol (i.e., diethylene glycol), triethylene glycol, propylene glycol, and spiroglycol;

aralkyl diols such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl) ether, and bisphenol S bis(2-hydroxyethyl) ether; and cyclic ethers such as 1,2-epoxyethane (i.e., ethylene oxide), 1,2-epoxypropane (i.e., propylene oxide), 1,2-epoxycyclopentane, 1,2-epoxycyclohexane, 1,4-epoxycyclohexane, 1-methyl-1,2-epoxycyclohexane, 2,3-epoxynorbornane, and 1,3-epoxypropane.

Carbonyl halides, carbonate esters, and so forth are examples of the carbonate precursors within the set of monomers that are starting materials for aromatic polycarbonate resins. A single carbonate precursor may be used or any combination of two or more in any proportions may be used.

The carbonyl halides can be specifically exemplified by phosgene and by haloformates such as the bischloroformates of dihydroxy compounds and the monochloroformates of dihydroxy compounds.

The carbonate esters can be specifically exemplified by diaryl carbonates such as diphenyl carbonate and ditolyl carbonate; dialkyl carbonates such as dimethyl carbonate and diethyl carbonate; and carbonates of dihydroxy compounds, e.g., biscarbonates of dihydroxy compounds, monocarbonates of dihydroxy compounds, and cyclic carbonates.

Polycarbonate Resin Production Methods

There are no particular limitations on the method of producing the polycarbonate resin and any method can be used. Examples thereof are interfacial polymerization method, melt transesterification method, pyridine method, ring-opening polymerization of a cyclic carbonate compound, and solid-state transesterification of a prepolymer. Those methods that are particularly advantageous among these methods are specifically described in the following.

Interfacial Polymerization Method

The production of polycarbonate resin by interfacial polymerization method will be described first. In the interfacial polymerization method, a dihydroxy compound and a carbonate precursor (preferably phosgene) are reacted in the presence of a reaction-inert organic solvent and an aqueous alkali solution generally while holding the pH at 9 or above, and the polycarbonate resin is obtained by subsequently carrying out an interfacial polymerization in the presence of a polymerization catalyst. As necessary, the reaction system may contain a molecular weight modifier (terminating agent) and may contain an oxidation inhibitor in order to inhibit oxidation of the dihydroxy compound.

The dihydroxy compound and carbonate precursor are as described above. The use of phosgene is preferred among the carbonate precursors, and the method using phosgene is then known in particular as a phosgene method.

The reaction-inert organic solvent can be exemplified by chlorinated hydrocarbons such as dichloromethane, 1,2-dichloroethane, chloroform, monochlorobenzene, and dichlorobenzene, and by aromatic hydrocarbons such as benzene, toluene, and xylene. A single organic solvent may be used or any combination of two or more organic solvents in any proportions may be used.

The alkali compound in the aqueous alkali solution can be exemplified by alkali metal compounds such as sodium hydroxide, potassium hydroxide, lithium hydroxide, and sodium bicarbonate and by alkaline-earth metal compounds, whereamong sodium hydroxide and potassium hydroxide are preferred. A single alkali compound may be used or any combination of two or more alkali compounds in any proportions may be used.

There are no limitations on the concentration of the alkali compound in the aqueous alkali solution, and generally 5 to 10 mass % is used in order to control the pH in the aqueous alkali solution during the reaction to 10 to 12. In addition, for example, in order to control the pH of the aqueous phase to 10 to 12 and preferably 10 to 11 during phosgene injection, the molar ratio between the bisphenol compound and the alkali compound is generally 1:at least 1.9 and preferably 1:at least 2.0 and is generally 1:not more than 3.2, and preferably 1:not more than 2.5.

The polymerization catalyst can be exemplified by aliphatic tertiary amines such as trimethylamine, triethylamine, tributylamine, tripropylamine, and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzylammonium chloride, tetramethylammonium chloride, and triethylbenzylammonium chloride; pyridine; and guanidine salts. A single polymerization catalyst may be used or any combination of two or more polymerization catalysts in any proportions may be used.

The molecular weight modifier can be exemplified by monohydric aromatic phenols that have a phenolic hydroxyl group, aliphatic alcohols such as methanol and butanol, mercaptan, and phthalimide, among which the aromatic phenols are preferred. These aromatic phenols can be specifically exemplified by alkyl group-substituted phenols such as m-methylphenol, p-methylphenol, m-propylphenol, p-propylphenol, p-tert-butylphenol, and p-(long chain alkyl)-substituted phenol; vinyl group-containing phenols such as isopropenylphenol; epoxy group-containing phenols; and carboxyl group-containing phenols such as o-oxybenzoic acid and 2-methyl-6-hydroxyphenylacetic acid. A single molecular weight modifier may be used or any combination of two or more molecular weight modifiers in any proportions may be used.

The amount of use of the molecular weight modifier, expressed per 100 moles of the dihydroxy compound, is generally at least 0.5 moles and is preferably at least 1 mole and is generally not more than 50 moles and is preferably not more than 30 moles. The thermal stability and hydrolysis resistance of the polycarbonate resin composition can be enhanced by having the amount of use of the molecular weight modifier be in the indicated range.

The mixing sequence for the reaction substrates, reaction medium, catalyst, additives, and so forth during the reaction may be freely selected as long as the desired polycarbonate resin is obtained, and the sequence may be freely established as appropriate. For example, when phosgene is used as the carbonate precursor, the molecular weight modifier may be admixed at any time from the reaction between the dihydroxy compound and the phosgene (phosgenation) up to and including the point at which the polymerization reaction is begun.

The reaction temperature is generally 0 to 40° C., and the reaction time is generally several minutes (for example, 10 minutes) to several hours (for example, 6 hours).

Melt Transesterification Method

The production of the polycarbonate resin by the melt transesterification method will now be described. For example, a transesterification reaction between a carbonate diester and a dihydroxy compound is carried out in the melt transesterification method.

The dihydroxy compound is as described above.

The carbonate diester, on the other hand, can be exemplified by dialkyl carbonate compounds such as dimethyl carbonate, diethyl carbonate, and di-tert-butyl carbonate; diphenyl carbonate; and substituted diphenyl carbonates such as ditolyl carbonate. Among these, diphenyl carbonate and substituted diphenyl carbonates are preferred and in particular diphenyl carbonate is more preferred. A single carbonate diester may be used or any combination of two or more carbonate diesters in any proportions may be used.

Any ratio between the dihydroxy compound and carbonate diester may be used as long as the desired polycarbonate resin is obtained, but preferably the carbonate diester is used in at least an equimolar amount per 1 mole of the dihydroxy compound, while the use of at least 1.01 moles per 1 mole of the dihydroxy compound is more preferred. The upper limit is generally 1.30 mole or less. Using this range makes it possible to adjust the amount of hydroxyl terminal groups into a suitable range.

The amount of terminal hydroxyl group in a polycarbonate resin tends to exercise a major influence on, inter alia, the thermal stability, hydrolysis stability, and color. Due to this, as necessary the amount of terminal hydroxyl group may be adjusted by any known method. A polycarbonate resin having an adjusted amount of terminal hydroxyl group can be obtained in general by adjustment or control of, for example, the mixing ratio between the carbonate diester and the aromatic dihydroxy compound and/or the depth of the vacuum during the transesterification reaction. The molecular weight of the obtained polycarbonate resin can also generally be adjusted by these processes.

The previously indicated mixing ratio applies when the amount of terminal hydroxyl group is adjusted through adjustment of the mixing ratio between the carbonate diester and dihydroxy compound.

In addition, a separate admixture of the terminating agent may be carried out during the reaction in a more aggressive adjustment method. The terminating agent here can be exemplified by monohydric phenols, monobasic carboxylic acids, and carbonate diesters. A single terminating agent may be used or any combination of two or more terminating agents in any proportions may be used.

A transesterification catalyst is generally used in the production of polycarbonate resin by the melt transesterification method. Any transesterification catalyst can be used. Within this sphere, for example, the use of alkali metal compounds and/or alkaline-earth metal compounds is preferred. In combination therewith, for example, a basic compound, e.g., a basic boron compound, basic phosphorus compound, basic ammonium compound, or an amine compound, may also be used on an auxiliary basis. A single transesterification catalyst may be used or any combination of two or more transesterification catalysts in any proportions may be used.

The reaction temperature in the melt transesterification method is generally 100 to 320° C. The pressure during the reaction is generally a vacuum of 2 mmHg or below. The specific process may be the execution of a melt polycondensation reaction under the indicated conditions while removing by-products, for example, an aromatic hydroxy compound.

The melt polycondensation reaction can be carried out by a batch method or continuous method. In the case of the batch method, the mixing sequence for the reaction substrates, reaction medium, catalyst, additives, and so forth may be freely selected as long as the desired aromatic polycarbonate resin is obtained, and the sequence may be freely established as appropriate. The melt polycondensation reaction, however, is preferably carried out using a continuous regime based on a consideration of the stability of the polycarbonate resin and polycarbonate resin composition.

A catalyst deactivator may also be used in the melt transesterification method on an optional basis. Any compound that can neutralize the transesterification catalyst can be used as the catalyst deactivator. Examples here are sulfur-containing acidic compounds and their derivatives. A single catalyst deactivator may be used or any combination of two or more catalyst deactivators in any proportions may be used.

The amount of use of the catalyst deactivator, expressed with reference to the alkali metal or alkaline-earth metal present in the transesterification catalyst, is generally at least 0.5 equivalents and preferably at least 1 equivalent and is generally not more than 10 equivalents and is preferably not more than 5 equivalents. In addition, it is generally at least 1 ppm and generally not more than 100 ppm and preferably not more than 20 ppm, with reference to the aromatic polycarbonate resin.

Other Items Concerning the Polycarbonate Resin

The molecular weight of the polycarbonate resin may be freely selected and may be determined by selection as appropriate, but the viscosity-average molecular weight [Mv] obtained from the solution viscosity is generally at least 10,000 and is preferably at least 16,000 and more preferably at least 17,000 and is generally not more than 40,000 and preferably not more than 30,000 and more preferably not more than 24,000. Having the viscosity-average molecular weight be at least the lower limit value for the indicated range can bring about additional enhancements in the mechanical strength of the polycarbonate resin composition of the present invention and is thus more preferred in those instances of use in applications with high mechanical strength requirements. On the other hand, having the viscosity-average molecular weight be not more than the upper limit value for the indicated range can better restrain reductions in the fluidity of the polycarbonate resin composition of the present invention and can also raise the molding workability and facilitate the execution of thin-wall molding.

A mixture of two or more polycarbonate resins having different viscosity-average molecular weights may be used, in which case a polycarbonate resin having a viscosity-average molecular weight outside the preferred range given above may be admixed.

The viscosity-average molecular weight [Mv] here refers to the value calculated using Schnell's viscosity equation, i.e., $\eta=1.23\times10^{-4}$ $Mv^{0.83}$, wherein the intrinsic viscosity $[\eta]$ (unit: dl/g) at 20° C. is determined using methylene chloride as the solvent and using a Ubbelohde viscometer. The intrinsic viscosity $[\eta]$ is the value calculated using the following formula and the specific viscosity $[\eta_{sp}]$ at each solution concentration [C] (g/dl).

$$\eta = \lim_{c \to 0} \eta_{sp}/c \qquad \text{[Math. 1]}$$

The concentration of the terminal hydroxyl groups in the polycarbonate resin may be freely selected and may be determined by selection as appropriate, but will generally be not more than 1,000 ppm and is preferably not more than 800 ppm and more preferably not more than 600 ppm. This makes it possible to bring about additional improvements in the residence heat stability and color of the polycarbonate resin composition of the present invention. In addition, the lower limit here—particularly for polycarbonate resin produced by the melt transesterification method—is generally at least 10 ppm and is preferably at least 30 ppm and more preferably at least 40 ppm. This makes it possible to suppress reductions in the molecular weight and to bring about additional improvements in the mechanical properties of the polycarbonate resin composition of the present invention.

The unit for the terminal hydroxyl group concentration is the mass of the terminal hydroxyl groups expressed as ppm with reference to the mass of the polycarbonate resin. The measurement method here is colorimetric determination by the titanium tetrachloride/acetic acid method (Macromol. Chem., 88 215 (1965)).

The polycarbonate resin may be used in the form of polycarbonate resin proper (this polycarbonate resin proper is not limited to an embodiment that contains only a single species of polycarbonate resin, but is used in the sense of including embodiments that contain a plurality of polycarbonate resin species having different monomer compositions or molecular weights from one another) or may be used in combination with an alloy (mixture) of a polycarbonate resin and another thermoplastic resin. Moreover, it may be structured as a copolymer in which polycarbonate resin is the major portion, for example, as a copolymer of a polycarbonate resin with a siloxane structure-containing oligomer or polymer, with the goal of raising the flame retardancy and impact resistance still further; as a copolymer of a polycarbonate resin with a phosphorus atom-containing monomer, oligomer, or polymer, with the goal of raising the thermal oxidation stability and flame retardancy still further; as a copolymer of a polycarbonate resin with a dihydroxyanthraquinone structure-bearing monomer, oligomer, or polymer, with the goal of improving the thermal oxidation stability; as a copolymer of a polycarbonate resin with an oligomer or polymer having an olefinic structure, e.g., polystyrene, in order to improve the optical properties; or as a copolymer of a polycarbonate resin with a polyester resin oligomer or polymer with the goal of enhancing the chemical resistance.

In addition, the polycarbonate resin may contain a polycarbonate oligomer in order to bring about an improved appearance for the molded article and improve the fluidity. The viscosity-average molecular weight [Mv] of this polycarbonate oligomer is generally at least 1,500 and is preferably at least 2,000 and is generally not more than 9,500 and is preferably not more than 9,000. The incorporated polycarbonate oligomer is preferably not more than 30 mass % of the polycarbonate resin (including the polycarbonate oligomer).

Moreover, the polycarbonate resin need not be a virgin raw material, but may also be a polycarbonate resin that has been regenerated from post-consumer products (what is known as material-recycled polycarbonate resin). These post-consumer products can be exemplified by optical recording media such as optical disks; light guide plates; transparent vehicle parts such as automotive window glass, automotive head lamp lenses, and windshields; containers such as water bottles; eyeglass lenses; and building components such as soundproof walls, glazing, and corrugated sheet. Also usable are the ground products obtained from, for example, defective products, sprues, and runners and pellets obtained by melting these.

However, regenerated polycarbonate resin preferably is not more than 80 mass % of the polycarbonate resin present in the polycarbonate resin composition of the present invention and is more preferably not more than 50 mass % thereof. Since regenerated polycarbonate resin has a high potential for deterioration, e.g., thermal deterioration, aged deterioration, and so forth, the use of such a polycarbonate resin in amounts larger than the indicated range creates the possibility of a decline in the color and mechanical properties.

[Metal Organosulfonate Salt (B)]

The polycarbonate resin composition of the present invention is characterized by containing a metal organosulfonate salt (B) as a flame retardant, in a content of 0.001 to 1 mass part per 100 mass parts of the polycarbonate resin (A). The incorporation of the metal organosulfonate salt (B) in the indicated amount can promote carbonization layer formation during combustion of the polycarbonate resin, thus raising the flame retardancy even higher, and in combination with this makes it possible to maintain the properties possessed by the polycarbonate resin, e.g., electrical properties, heat resistance, and mechanical properties such as impact resistance, at excellent levels.

There are no particular limitations on the metal in the metal organosulfonate salt (B), but it is preferably an alkali metal such as sodium, lithium, potassium, rubidium, or cesium, or an alkaline-earth metal such as beryllium, magnesium, calcium, strontium, or barium.

The alkali metals are preferred here, and sodium, potassium, cesium, and lithium are more preferred; sodium, potassium, and cesium are even more preferred; and sodium and potassium are particularly preferred. Potassium is preferred among the preceding from the standpoint of the flame retardancy and hydrolysis resistance.

The following are preferred for the metal organosulfonate salt (B): the metal salts of fluorine-containing aliphatic sulfonic acids, the metal salts of fluorine-containing aliphatic sulfonimides, the metal salts of aromatic sulfonic acids, and the metal salts of aromatic sulfonamides.

Specific examples within this preferred sphere are as follows:

the metal salts of fluorine-containing aliphatic sulfonic acids, such as the alkali metal salts of fluorine-containing aliphatic sulfonic acids that contain at least one C—F bond in the molecule, e.g., potassium nonafluorobutanesulfonate, lithium nonafluorobutanesulfonate, sodium nonafluorobutanesulfonate, cesium nonafluorobutanesulfonate, lithium trifluoromethanesulfonate, sodium trifluoromethanesulfonate, potassium trifluoromethanesulfonate, potassium pentafluoroethanesulfonate, potassium heptafluoropropanesulfonate, and potassium decafluoro-4-(pentafluoroethyl)cyclohexanesulfonate, the alkaline-earth metal salts of fluorine-containing aliphatic sulfonic acids that contain at least one C—F bond in the molecule, e.g., magnesium nonafluorobutanesulfonate, calcium nonafluorobutanesulfonate, barium nonafluorobutanesulfonate, magnesium trifluoromethanesulfonate, calcium trifluoromethanesulfonate, and barium trifluoromethanesulfonate, and the alkali metal salts of fluorine-containing aliphatic disulfonic acids that contain at least one C—F bond in the molecule, e.g., disodium difluoromethanedisulfonate, dipotassium difluoromethanedisulfonate, disodium tetrafluoroethanedisulfonate, dipotassium tetrafluoroethanedisulfonate, dipotassium hexafluoropropanedisulfonate, dipotassium hexafluoroisopropanedisulfonate, disodium octafluorobutanedisulfonate, and dipotassium octafluorobutanedisulfonate;

the metal salts of fluorine-containing aliphatic sulfonimides, such as the alkali metal salts of fluorine-containing aliphatic disulfonimides that contain at least one C—F bond in the molecule, e.g., lithium bis(perfluoropropanesulfonyl)imide, sodium bis(perfluoropropanesulfonyl)imide, potassium bis (perfluoropropanesulfonyl)imide, lithium bis(perfluorobutanesulfonyl)imide, sodium bis(perfluorobutanesulfonyl)imide, potassium bis(perfluorobutanesulfonyl)imide, potassium trifluoromethane(pentafluoroethane)sulfonylimide, sodium trifluoromethane(nonafluorobutane)sulfonylimide, potassium trifluoromethane(nonafluorobutane)sulfonylimide, and the alkali metal salts of cyclic fluorine-containing aliphatic sulfonimides that contain at least one C—F bond in the molecule, e.g., lithium cyclo-hexafluoropropane-1,3-bis(sulfonyl)imide, sodium cyclo-hexafluoropropane-1,3-bis(sulfonyl)imide, and potassium cyclo-hexafluoropropane-1,3-bis (sulfonylimide);

the metal salts of aromatic sulfonic acids, such as the alkali metal salts of aromatic sulfonic acids that have at least one aromatic group in the molecule, e.g., dipotassium diphenyl sulfone-3,3'-disulfonate, potassium diphenyl sulfone-3-sulfonate, sodium benzenesulfonate, sodium (poly) styrenesulfonate, sodium para-toluenesulfonate, sodium (branched)dodecylbenzenesulfonate, sodium trichlorobenzenesulfonate, potassium benzenesulfonate, potassium styrenesulfonate, potassium (poly) styrenesulfonate, potassium para-toluenesulfonate, potassium (branched)dodecylbenzenesulfonate, potassium trichlorobenzenesulfonate, cesium benzenesulfonate, cesium (poly) styrenesulfonate, cesium para-toluenesulfonate, cesium (branched)dodecylbenzenesulfonate, and cesium trichlorobenzenesulfonate, and the alkaline-earth metal salts of aromatic sulfonic acids that have at least one aromatic group in the molecule, e.g., magnesium para-toluenesulfonate, calcium para-toluenesulfonate, strontium para-toluenesulfonate, barium para-toluenesulfonate, magnesium (branched)dodecylbenzenesulfonate, and calcium (branched)dodecylbenzenesulfonate; and the metal salts of aromatic sulfonamides, such as the alkali metal salts of aromatic sulfonamides that have at least one aromatic group in the molecule, e.g., the sodium salt of saccharin, the potassium salt of N-(p-tolylsulfonyl)-p-toluenesulfoimide, the potassium salt of N—(N'-benzylaminocarbonyl)sulfanylimide, and the potassium salt of N-(phenylcarboxyl)sulfanylimide.

The metal salts of fluorine-containing aliphatic sulfonic acids and the metal salts of aromatic sulfonic acids are more preferred among the preceding, while the metal salts of fluorine-containing aliphatic sulfonic acids are particularly preferred.

With regard to the metal salts of fluorine-containing aliphatic sulfonic acids, the alkali metal salts of fluorine-containing aliphatic sulfonic acids that have at least one C—F bond in the molecule are more preferred; the alkali metal salts of perfluoroalkanesulfonic acids are particularly preferred; and potassium nonafluorobutanesulfonate is specifically preferred.

With regard to the metal salts of aromatic sulfonic acids, the alkali metal salts of aromatic sulfonic acids are more preferred; the alkali metal salts of diphenyl sulfone sulfonic acids such as dipotassium diphenyl sulfone-3,3'-disulfonate and potassium diphenyl sulfone-3-sulfonate, and the alkali metal salts of para-toluenesulfonic acid such as sodium para-toluenesulfonate, potassium para-toluenesulfonate, and cesium para-toluenesulfonate, are particularly preferred; and the alkali metal salts of para-toluenesulfonic acid are even more preferred.

A single metal organosulfonate salt (B) may be used or any combination of two or more in any proportions may be used.

The content of the metal organosulfonate salt (B), expressed per 100 mass parts of the polycarbonate resin (A), is 0.001 to 1 mass part and is preferably at least 0.01 mass parts, more preferably at least 0.03 mass parts, even more preferably at least 0.05 mass parts, and particularly preferably at least 0.07 mass parts and is preferably not more than 0.7 mass parts, more preferably not more than 0.5 mass parts, even more preferably not more than 0.3 mass parts, and particularly preferably not more than 0.2 mass parts. It is difficult to obtain a satisfactory flame retardancy when the content is less than 0.001 mass parts, while the thermal stability and hydrolysis resistance readily decline at more than 1 mass part.

[Core/Shell Graft Copolymer (C)]

The core/shell graft copolymer (C) used by the present invention is a core/shell graft copolymer in which the core is a butadienic rubber component, and is characterized in that the Si content in the core/shell graft copolymer (C) is at least 300 ppm.

The core/shell graft copolymer (C) in the present invention has a butadienic rubber component for the core component that forms the core, and is not a core/shell graft copolymer in which the main constituent component of the core is a siloxanic rubber component.

Preferred specific examples of the dienic rubber component that forms the core are butadienic rubbers such as polybutadiene rubber, acrylonitrile-butadiene rubber, styrene-butadiene rubber, ethylene-butadiene rubber, and ethylene-propylene-butadiene ternary copolymers (EPDM), wherein polybutadiene rubber and styrene-butadiene rubber are more preferred.

A single one of these may be used or a mixture of two or more may be used.

The vinyl monomer that is graft polymerized on the butadienic rubber in the core/shell graft copolymer used by the present invention is preferably a (meth)acrylate monomer such as an alkyl (meth)acrylate, e.g., methyl acrylate, methyl methacrylate, ethyl acrylate, ethyl methacrylate, n-butyl acrylate, and n-butyl methacrylate; an aryl (meth)acrylate such as phenyl methacrylate, phenyl acrylate, naphthyl acrylate, and naphthyl methacrylate; or a glycidyl group-containing (meth)acrylate such as glycidyl acrylate and glycidyl methacrylate, while methyl methacrylate is particularly preferred.

Another vinyl monomer may also be copolymerized in addition to the aforementioned (meth)acrylate monomer, for example, an aryl vinyl compound such as styrene or α-methylstyrene; an unsaturated nitrile compound such as acrylonitrile or methacrylonitrile; a vinyl ether compound such as methyl vinyl ether or butyl vinyl ether; a vinyl halide compound such as vinyl chloride or vinyl bromide; or a vinylidene halide compound such as vinylidene chloride or vinylidene bromide.

The content of the butadienic rubber component in the core/shell graft copolymer (C), expressed using 100 mass % for the mass of the overall core/shell graft copolymer (C), is preferably at least 50 mass %, more preferably at least 55 mass %, and even more preferably at least 70 mass % and is preferably not more than 95 mass %, more preferably not more than 90 mass %, and even more preferably not more than 85 mass %. Substantial improvements in the flame retardancy and impact resistance can be brought about by having the butadiene content be within the indicated range.

The improvement in the flame retardancy and impact resistance may be inadequate when the butadiene content is less than the lower limit value indicated above. When the butadiene content exceeds the upper limit value on the range indicated above, the dispersibility of the graft copolymer (C) in the polycarbonate resin is extremely reduced and the impact resistance of the polycarbonate resin composition of the present invention may be reduced and a poor appearance may be produced.

The content of the vinyl monomer graft polymerized on the butadienic rubber in the core/shell graft copolymer (C), expressed using 100 mass % for the mass of the overall core/shell graft copolymer (C), is preferably at least 2 mass %, more preferably at least 5 mass %, and even more preferably at least 10 mass % and is preferably not more than 50 mass %, more preferably not more than 45 mass %, and even more preferably not more than 30 mass %. Substantial enhancements in the flame retardancy and impact resistance can be brought about by having the content of the grafted vinyl monomer be within the indicated range.

When the proportion of the grafted vinyl monomer is less than 1 mass %, the dispersibility of the graft copolymer (C) in the polycarbonate resin is extremely reduced and the impact resistance of the polycarbonate resin composition of the present invention may be reduced and a poor appearance may be produced. A deterioration in the flame retardancy may be produced at above 50 mass %.

The core/shell graft copolymer (C) preferably has an average particle diameter of 80 to 800 nm. A deterioration in the flame retardancy may be produced when the average particle diameter is less than 80 nm, while a poor appearance may be produced at larger than 800 nm. A more preferred range for the average particle diameter is 120 to 400 nm, and the most stable manifestation of the impact resistance can be expected for this range.

Methods for producing core/shell graft copolymers are known, and a known method may also be used in the present invention. The polymerization method used to produce the graft copolymer (C) may be, for example, bulk polymerization, solution polymerization, suspension polymerization, emulsion polymerization, and so forth, and the copolymerization mode may be a single-stage grafting or a multistage grafting. Among the preceding, emulsion polymerization is the easiest to carry out and is the preferred method.

The Si content in the core/shell graft copolymer (C) is characteristically at least 300 ppm in the present invention. It was discovered that the flame retardancy, impact resistance, and thermal stability can be made to co-exist in good balance at high levels by incorporating an inorganic silicon compound, e.g., sodium silicate, silicon dioxide, aluminosilicate, and so forth, in the core/shell graft copolymer (C) and combining this with the metal salt of an organophosphate ester (D). This Si content must be at least 300 ppm and is preferably at least 500 ppm, more preferably at least 700 ppm, even more preferably at least 1,000, and particularly preferably at least 1,200 ppm and is preferably not more than 10,000 ppm and more preferably not more than 8,000 ppm.

By having the Si content be this amount, a high flame retardancy and a high impact resistance can be exhibited and in addition an excellent thermal stability can be brought about. The Si content can be easily adjusted by adjusting the amount of silicon compound incorporation as indicated above.

The Si content in the core/shell graft copolymer (C) is determined by x-ray fluorescence analysis as described below in the examples.

The content of the core/shell graft copolymer (C), expressed per 100 mass parts of the polycarbonate resin (A), is in the range from 0.5 to 5 mass parts and is preferably at least 0.7 mass parts and more preferably at least 1 mass part and is preferably not more than 4 mass parts and more preferably not more than 3 mass parts. The improvement in the flame retardancy, impact resistance, and thermal stability that is an object of the present invention is not obtained at below 0.5 mass parts, while a reduction in the heat resistance and a deterioration in the flame retardancy of the polycarbonate resin composition are produced when 5 mass parts is exceeded.

[Metal Salt of an Organophosphate Ester (D)]

The organophosphate ester metal salt (D) that is used in the present invention in combination with the metal organosulfonate salt (B) and the core/shell graft copolymer (C) has a substructure in which 1 to 3 alkoxy groups or aryloxy groups are bonded to a phosphorus atom. A substituent group may also be bonded to these alkoxy groups and aryloxy groups. It is preferably at least one organophosphate ester metal salt selected from the group consisting of organophosphate ester metal salts with the following general formulas (1), (2), (3), and (4), and a combination of two or more organophosphate ester metal salts with general formulas (1) to (4) may also be used.

[C1]

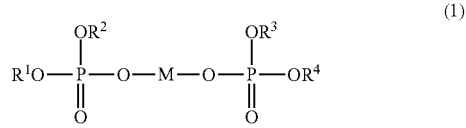

(In general formula (1), $R^1$ to $R^4$ are each independently an alkyl group or an aryl group and M represents a metal atom selected from the alkaline-earth metals and zinc.)

[C2]

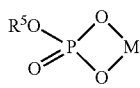

(In general formula (2), $R^5$ is an alkyl group or an aryl group and M is a metal atom selected from the alkaline-earth metals and zinc.)

[C3]

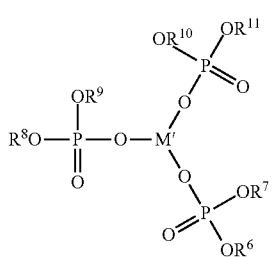

(In general formula (3), $R^6$ to $R^{11}$ are each independently an alkyl group or an aryl group and M' is a metal atom that forms a trivalent metal ion.)

[C4]

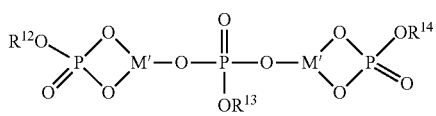

(In general formula (4), $R^{12}$ to $R^{14}$ are each independently an alkyl group or an aryl group. M' is a metal atom that forms a trivalent metal ion, and the two M' may be the same as each other or may differ from one another.)

$R^1$ to $R^{14}$ in general formulas (1) to (4) are each preferably an alkyl group having 1 to 30 carbons or an aryl group having 6 to 30 carbons and are each more preferably an alkyl group having 2 to 25 carbons and are each particularly preferably an alkyl group having 6 to 23 carbons. Viewed from the standpoint of the flame retardancy, impact resistance, and thermal stability, an alkyl group having 2 to 25 carbons is preferred and an alkyl group having 6 to 23 carbons is most preferred. Preferred examples of the alkyl group are octyl group, 2-ethylhexyl group, isooctyl group, nonyl group, isononyl group, decyl group, isodecyl group, dodecyl group, tridecyl group, isotridecyl group, tetradecyl group, hexadecyl group, and octadecyl group. M in general formulas (1) and (2) is preferably zinc atom, and M' in general formulas (3) and (4) is preferably aluminum atom.

The organophosphate ester metal salt is preferably a mixture of the organophosphate ester metal salt with general formula (1) and the organophosphate ester metal salt with general formula (2); $R^1$ to $R^5$ in general formulas (1) and (2) are each more preferably an alkyl group having 2 to 25 carbons; and M in general formulas (1) and (2) is particularly preferably zinc atom. The mass ratio in a mixture of the organophosphate ester metal salt with general formula (1) and the organophosphate ester metal salt with general formula (2) is preferably 10/90 to 90/10, more preferably 20/80 to 60/40, and particularly preferably 30/70 to 50/50.

Preferred specific examples of the organophosphate ester metal salt are zinc bis(distearyl acid phosphate) for compounds with general formula (1), zinc monostearyl acid phosphate for compounds with general formula (2), aluminum tris(distearyl acid phosphate) for compounds with general formula (3), and the salt between one monostearyl acid phosphate and two aluminum monostearyl acid phosphates for compounds with general formula (4). A single one of these may be used or a mixture may be used.

The content of the organophosphate ester metal salt (D), expressed with reference to 100 mass parts of the core/shell graft copolymer (C), is 0.1 to 3 mass parts, preferably 0.1 to 2.5 mass parts, and more preferably 0.1 to 2 mass parts. A polycarbonate resin composition with an excellent thermal stability is obtained by having the organophosphate ester metal salt (D) be within the indicated range.

[Fluorine-Containing Resins]

The polycarbonate resin composition of the present invention preferably contains a fluorine-containing resin, and the amount thereof is preferably 0.001 to 1 mass part per 100 mass parts of the polycarbonate resin (A). A single fluorine-containing resin may be used or any combination of two or more in any proportions may be used. The incorporation of this fluorine-containing resin can improve the melt properties of the resin composition and can enhance the anti-dripping behavior during burning.

The improvement in the flame retardancy readily becomes unsatisfactory when the content of the fluorine-containing resin is less than 0.001 mass parts. At more than 1 mass part a reduction in the mechanical strength and a poor appearance are readily produced in the molded article molded from the polycarbonate resin composition. The content of the fluorine-containing resin, expressed per 100 mass parts of the polycarbonate resin (A), is more preferably at least 0.01 mass parts, even more preferably at least 0.05 mass parts, and particularly preferably at least 0.1 mass parts, and is more preferably not more than 0.9 mass parts, even more preferably not more than 0.8 mass parts, and particularly preferably not more than 0.6 mass parts.

The fluorine-containing resin is preferably a fluoroolefin resin. This fluoroolefin resin is generally a polymer or copolymer that contains the fluoroethylene structure and can be specifically exemplified by difluoroethylene resins, tetrafluoroethylene resins, and tetrafluoroethylene/hexafluoropropylene copolymer resins, whereamong tetrafluoroethylene resins are preferred.

This fluorine-containing resin is preferably a fluorine-containing resin having fibril-forming ability and can be specifically exemplified by fluoroolefin resins with fibril-forming ability. A substantial improvement in the anti-dripping behavior during burning is obtained by the presence of this fibril-forming ability.

An organic polymer-coated fluoroolefin resin may also be advantageously used as the fluorine-containing resin. The use of an organic polymer-coated fluoroolefin resin makes it possible to improve the dispersibility, improve the surface appearance of the molded articles, and suppress foreign material on the surface. The organic polymer-coated fluoroolefin resin can be prepared by various known methods, for example, as follows: (1) a production method in which a water-based dispersion of polyfluoroethylene particles is mixed with a water-based dispersion of organic polymer particles, followed by powder formation by solidification or spray drying; (2) a production method in which an organic polymer-forming monomer is polymerized in the presence of a water-based dispersion of polyfluoroethylene particles, followed by powder formation by solidification or spray drying; and (3) a production method in which an ethylenically unsaturated monomer is emulsion polymerized in a dispersion obtained by mixing a water-based dispersion of polyfluoroethylene particles with a water-based dispersion of organic polymer particles, followed by powder formation by solidification or spray drying.

Viewed from the perspective of the dispersibility when incorporated into the polycarbonate resin, the monomer for forming the organic polymer that coats the fluoroolefin resin preferably has a high affinity for polycarbonate resins, and aromatic vinyl monomers, (meth)acrylate ester monomers, and vinyl cyanide monomers are more preferred.

[Phosphorus Stabilizers]

The polycarbonate resin composition of the present invention preferably contains a phosphorus stabilizer. Any known phosphorus stabilizer can be used here. Specific examples are the oxo acids of phosphorus, e.g., phosphoric acid, phosphonic acid, phosphorous acid, phosphinic acid, and polyphosphoric acid; acidic pyrophosphate metal salts, e.g., sodium acid pyrophosphate, potassium acid pyrophosphate, and calcium acid pyrophosphate; the phosphates of a Group I or Group IIB metal, e.g., potassium phosphate, sodium phosphate, cesium phosphate, and zinc phosphate; and also organophosphate compounds, organophosphite compounds, and organophosphonite compounds, with organophosphite compounds being particularly preferred.

The organophosphite compounds can be exemplified by triphenyl phosphite, tris(mononoylphenyl)phosphite, tris(mononoyl/dinonyl-phenyl)phosphite, tris(2,4-di-tert-butylphenyl)phosphite, monooctyl diphenyl phosphite, dioctyl monophenyl phosphite, monodecyl diphenyl phosphite, didecyl monophenyl phosphite, tridecyl phosphite, trilauryl phosphite, tristearyl phosphite, and 2,2-methylenebis(4,6-di-tert-butylphenyl) octyl phosphite. These organophosphite compounds can be specifically exemplified by "Adeka Stab 1178", "Adeka Stab 2112", and "Adeka Stab HP-10" from the ADEKA Corporation; "JP-351", "JP-360" and "JP-3CP" from Johoku Chemical Co., Ltd.; and "Irgafos 168" from BASF.

A single phosphorus stabilizer may be incorporated or any combination of two or more in any proportions may be incorporated.

The content of the phosphorus stabilizer, expressed per 100 mass parts of the polycarbonate resin (A), is generally at least 0.001 mass parts and is preferably at least 0.01 mass parts and more preferably at least 0.03 mass parts and is generally not more than 1 mass part and is preferably not more than 0.7 mass parts and more preferably not more than 0.5 mass parts. The heat-stabilizing action may be unsatisfactory when the phosphorus stabilizer content is less than the lower limit value for the indicated range, while the effect can plateau out when the phosphorus stabilizer content exceeds the upper limit value for the indicated range, thus becoming uneconomical.

[Phenolic Stabilizers]

The polycarbonate resin composition of the present invention also preferably contains a phenolic stabilizer. The phenolic stabilizer can be exemplified by hindered phenolic oxidation inhibitors. Specific examples are pentaerythritol tetrakis[3-(3,5-di-tert-butyl-4-hydroxyphenyl)propionate], octadecyl 3-(3,5-di-tert-butyl-4-hydroxyphenyl)propionate, thiodiethylenebis[3-(3,5-di-tert-butyl-4-hydrophenyl) propionate], N,N'-hexan-1,6-diylbis[3-(3,5-di-tert-butyl-4-hydroxyphenyl)propionamide], 2,4-dimethyl-6-(1-methylpentadecyl)phenol, diethyl[[3,5-bis(1,1-dimethylethyl)-4-hydroxyphenyl]methyl]phosphoate, 3,3',3",5,5',5"-hexatert-butyl-α,α',α"-(mesitylen-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenylpropionate], 1,3,5-tris(3,5-di-tert-butyl-4-hydroxybenzyl)-1,3,5-triazine-2,4,6(1H,3H,5H)trione, 2,6-di-tert-butyl-4-(4,6-bis(octylthio)-1,3,5-triazin-2-ylamino)phenol, and 2-[1-(2-hydroxy-3,5-di-tert-pentylphenyl)ethyl]-4,6-di-tert-pentylphenyl acrylate.

Pentaerythritol tetrakis[3-(3,5-di-tert-butyl-4-hydroxyphenyl)propionate] and octadecyl 3-(3,5-di-tert-butyl-4-hydroxyphenyl)propionate are preferred among the preceding. These phenolic oxidation inhibitors can be specifically exemplified by "Irganox 1010" and "Irganox 1076" from BASF and "Adeka Stab AO-50" and "Adeka Stab AO-60" from the ADEKA Corporation.

A single phenolic stabilizer may be incorporated or any combination of two or more in any proportions may be incorporated.

The content of the phenolic stabilizer, expressed per 100 mass parts of the polycarbonate resin (A), is generally at least 0.001 mass parts and is preferably at least 0.01 mass parts and is generally not more than 1 mass part and is preferably not more than 0.5 mass parts. The effect from the operation of the phenolic stabilizer may be inadequate when the content of the phenolic stabilizer is below the lower limit value on the indicated range, while the effect can plateau out when the content of the phenolic stabilizer exceeds the upper limit value for the indicated range, thus becoming uneconomical.

[Mold Releasing Agents]

The polycarbonate resin composition of the present invention also preferably contains a mold releasing agent. The mold releasing agent can be exemplified by aliphatic carboxylic acids, esters between an alcohol and an aliphatic carboxylic acid, aliphatic hydrocarbon compounds having a number-average molecular weight of 200 to 15,000, and polysiloxane-type silicone oils.

The aliphatic carboxylic acids can be exemplified by saturated and unsaturated aliphatic monobasic, dibasic, and tribasic carboxylic acids. Here, the aliphatic carboxylic acids also include alicyclic carboxylic acids. Among the preceding, the preferred aliphatic carboxylic acids are monobasic and dibasic carboxylic acids having from 6 to 36 carbons, and saturated aliphatic monobasic carboxylic acids having from 6 to 36 carbons are more preferred. These aliphatic carboxylic acids can be specifically exemplified by palmitic acid, stearic acid, caproic acid, capric acid, lauric acid, arachidic acid, behenic acid, lignoceric acid, cerotic acid, melissic acid, tetratriacontanoic acid, montanic acid, adipic acid, and azelaic acid.

The same aliphatic carboxylic acids as described above can be used as the aliphatic carboxylic acid in the esters between an aliphatic carboxylic acid and alcohol. The alcohol, on the other hand, can be exemplified by saturated and unsaturated monohydric and polyhydric alcohols. These alcohols may have a substituent such as, for example, the fluorine atom or an aryl group. Among the preceding, monohydric and polyhydric saturated alcohols having 30 or fewer carbons are preferred, while aliphatic saturated monohydric alcohols and aliphatic saturated polyhydric alcohols having 30 or fewer carbons are more preferred. Here, aliphatic is used as a term that also includes alicyclic compounds.

These alcohols can be specifically exemplified by octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylolpropane, and dipentaerythritol.

The ester referenced above may contain an aliphatic carboxylic and/or alcohol as an impurity. In addition, this ester may be a pure substance or may be a mixture of a plurality of compounds. Moreover, the aliphatic carboxylic acid bonded into a single ester may be a single species or any combination of two or more species in any proportions, and the alcohol bonded into a single ester may be a single species or any combination of two or more species in any proportions.

The ester between an aliphatic carboxylic acid and an alcohol can be specifically exemplified by beeswax (a mixture in which the major component is myricyl palmitate), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate, and pentaerythritol tetrastearate.

The aliphatic hydrocarbon with a number-average molecular weight of 200 to 15,000 can be exemplified by liquid paraffins, paraffin waxes, microwaxes, polyethylene waxes, Fischer-Tropsch waxes, and oligomers of $C_{3-12}$ α-olefin. This aliphatic hydrocarbon also includes alicyclic hydrocarbons. These hydrocarbons may also be partially oxidized.

Among the preceding, paraffin waxes, polyethylene waxes, and partially oxidized polyethylene waxes are preferred and paraffin waxes and polyethylene waxes are more preferred.

The number-average molecular weight of the aliphatic hydrocarbon is preferably not more than 5,000.

The aliphatic hydrocarbon may be a single material or may be a mixture of aliphatic hydrocarbons having various constituent components or molecular weights, and an aliphatic hydrocarbon can be used as long as its major component is within the range indicated above.

The polysiloxane-type silicone oil can be exemplified by dimethylsilicone oils, methylphenylsilicone oils, diphenylsilicone oils, and fluorinated alkylsilicones.

A single one of the aforementioned mold releasing agents may be incorporated or any combination of two or more in any proportions may be incorporated.

The content of the mold releasing agent, expressed per 100 mass parts of the polycarbonate resin (A), is generally at least 0.001 mass parts and is preferably at least 0.01 mass parts and is generally not more than 2 mass parts and is preferably not more than 1 mass part. The mold releasing effect may be unsatisfactory when the mold releasing agent content is less than the lower limit value for the indicated range. When the mold releasing agent content exceeds the upper limit value for the indicated range, for example, a reduction in the hydrolysis resistance, mold staining during injection molding, and so forth may be occurred.

[Other Components]

Insofar as the desired properties are not substantially impaired, the polycarbonate resin composition of the present invention may as necessary contain components in addition to those already described above. These additional components can be exemplified by resins other than polycarbonate resins and by various resin additives. A single one of these additional components may be incorporated or any combination of two or more in any proportions may be incorporated.

Other Resins

The other resins can be exemplified by thermoplastic polyester resins such as polyethylene terephthalate resin, polytrimethylene terephthalate resin, and polybutylene terephthalate resin; styrenic resins such as polystyrene resin, high-impact polystyrene resin (HIPS), and acrylonitrile-styrene copolymer (AS resins); polyolefin resins such as polyethylene resin and polypropylene resin; polyamide resins; polyimide resins; polyetherimide resins; polyurethane resins; polyphenylene ether resins; polyphenylene sulfide resins; polysulfone resins; and polymethacrylate resins.

A single one of these other resins may be incorporated or any combination of two or more in any proportions may be incorporated.

Resin Additives

The resin additives can be exemplified by ultraviolet absorbers, pigments (including carbon black), static inhibitors, antifogging agents, anti-blocking agents, fluidity improvers, plasticizers, dispersing agents, and antiseptics. A single one of these resin additives may be incorporated or any combination of two or more in any proportions may be incorporated.

[Method of Producing the Polycarbonate Resin Composition]

There are no limitations on the method of producing the polycarbonate resin composition of the present invention, and the known methods of producing polycarbonate resin compositions can be broadly employed.

A specific example is a method in which the polycarbonate resin (A), metal organosulfonate salt (B), core/shell graft copolymer (C), metal salt of an organophosphate ester (D), and other components to be incorporated on an optional basis are premixed using any of various mixing devices, e.g., a tumbler, Henschel mixer, and so forth, followed by melt kneading using a mixing device such as a Banbury mixer, roll, Brabender, single-screw kneading extruder, twin-screw kneading extruder, or kneader.

In addition, for example, the polycarbonate resin composition of the present invention may also be prepared by feeding the components to an extruder using a feeder, without premixing thereof or with premixing of only a portion of the components, and carrying out melt kneading.

Moreover, the polycarbonate resin composition of the present invention may also be prepared, for example, by obtaining a resin composition by premixing a portion of the components, feeding same to an extruder, and melt kneading, and, using the obtained resin composition as a masterbatch, re-mixing this masterbatch with the remaining components and melt kneading.

When a hard-to-disperse component is to be mixed, the dispersibility can be raised by preliminarily dissolving or dispersing this hard-to-disperse component in water or a solvent, e.g., an organic solvent, and kneading with this solution or dispersion.

Any molding technique generally used with polycarbonate resin compositions can be used as the method for producing molded articles. Examples here are injection molding methods, ultrahigh speed injection molding methods, injection compression molding methods, two-color molding methods, hollow molding methods such as gas-assisted moldings, molding methods using insulated molds, molding methods using rapidly heated molds, foam molding (also including molding method using supercritical fluids), insert molding, IMC (in-mold coating molding) molding methods, extrusion molding methods, sheet molding methods, thermoforming methods, rotational molding methods, laminate molding methods, press molding methods, and blow molding methods. Molding methods that use a hot runner technique can also be used. Injection molding methods, e.g., injection molding, ultrahigh speed injection molding, and injection compression molding, are preferred among the preceding.

[Molded Articles]

The molded articles can be exemplified by parts for electric and electronic equipment, office automation equipment, information terminal equipments, machinery parts, household appliances, vehicle parts, building materials, various containers, leisure goods, miscellaneous goods, and illumination devices. Among these, use for parts for electric and electronic equipment, office automation equipment, information terminal equipments, household appliances and lighting equipments is particularly advantageous.

EXAMPLES

The present invention is more specifically described below through examples. However, the present invention should not be construed as being limited to or by the examples that follow.

In the description that follows, unless specifically indicated otherwise, "parts" indicates "mass parts" on a mass basis.

The components used in the examples and comparative examples are given in the following Table 1.

TABLE 1

| component | code | description |
|---|---|---|
| polycarbonate resin (A) | A1 | "Iupilon S3000F" from Mitsubishi Engineering-Plastics Corp., viscosity-average molecular weight (Mv): 21,000 |
| | A2 | "Iupilon H4000F" from Mitsubishi Engineering-Plastics Corp., viscosity-average molecular weight (Mv): 16,000 |
| metal sulfonate salt (B) | B | potassium nonafluorobutanesulfonate, product name: Bayowet C4 (LANXESS KK) |
| core/shell graft copolymer (C) | C1 | core/shell graft copolymer, the core is a butadienic rubber and the shell is composed of methyl methacrylate and styrene. Si concentration: 2,580 ppm |
| | C2 | core/shell graft copolymer, the core is a butadienic rubber and the shell is composed of methyl methacrylate and styrene. Si concentration: 1,300 ppm |
| | C3 | core/shell graft copolymer, the core is a butadienic rubber and the shell is composed of methyl methacrylate and styrene. Si concentration: 520 ppm |
| | C4 | core/shell graft copolymer, the core is a butadienic rubber and the shell is composed of methyl methacrylate. Si concentration: 40 ppm |
| | C5 | core/shell graft copolymer, the core is a butadienic rubber and the shell is composed of methyl methacrylate and styrene. Si concentration: 50 ppm |
| metal salt of organophosphate ester (D) | D | mixture of zinc salt of distearyl acid phosphate and zinc salt of monostearyl acid phosphate, the chemical formulas given below. product name: JP-518Zn (Johoku Chemical Co.) $$\left[(C_{18}H_{37}O)_2-\overset{O}{\underset{\parallel}{P}}-O\right]_2 Zn$$ $$C_{18}H_{37}O-\overset{O}{\underset{\parallel}{P}}\diamond{O \atop O}Zn$$ |
| fluoropolymer | E | polytetrafluoroethylene, product name: FA-500H (Daikin Industries.) |
| stabilizer | F1 | phosphorus oxidation inhibitor, tris(2,4-di-tert-butylphenyl) phosphite, product name: Adeka Stab 2112 (ADEKA Corp.) |
| | F2 | phenolic oxidation inhibitor, pentaerythritol tetrakis [3-(3,5-di-tert-butyl-4-hydroxyphenyl)propionate], product name: Irganox 1010 (BASF Japan Ltd.) |
| mold releasing agent | G1 | pentaerythritol tetrastearate, product name: VPG861 (Cognis Oleochemicals Japan Ltd.) |
| | G2 | stearyl stearate, product name: M-9676 (NOF Corporation) |

The Si content in the core/shell graft copolymer was measured using an x-ray fluorescence spectrometer (ZSX Primus, Rigaku Corporation). The measurement was performed under a vacuum using an Rh tube for the tube and using a 30 mm$\phi$ irradiation area.

Examples 1 to 7 and Comparative Examples 1 to 5

Resin Pellet Production

The components indicated in Table 1 were blended in the proportions (mass ratio) given in Tables 3 and 4 below, and, after mixing for 20 minutes in a tumbler, were fed to a twin-screw extruder (TEX30HSST, from The Japan Steel Works, Ltd.) equipped with a single vent and were kneaded at a screw rotation rate of 200 rpm, extrusion rate of 15 kg/hour, and barrel temperature of 280° C. The melted resin was extruded into strand form and was quenched in a water bath and pelletized using a pelletizer to obtain pellets of a polycarbonate resin composition.

[Evaluation of Flame Retardancy by UL94 Test]

After the pellets obtained by the aforementioned production method had been dried for 4 hours at 120° C., a test specimen for UL testing with a length of 125 mm, width of 13 mm, and thickness of 1.1 mm was molded by injection molding at a cylinder temperature of 270° C. and a mold temperature of 80° C. using a model SE100DU injection molder from Sumitomo Heavy Industries, Ltd.

The flame retardancy of each polycarbonate resin composition was evaluated in accordance with the UL94 test (Test for Flammability of Plastic Materials for Parts in Devices and Appliances) established by Underwriters Laboratories (UL) (USA), after the test specimen for UL testing obtained by the aforementioned method had been conditioned for 48 hours in a thermostat chamber at a temperature of 23° C. and a humidity of 50%.

UL94V is a method in which the flame retardancy is evaluated based on the burning time and dripping behavior after a burner flame has been applied for 10 seconds to a test specimen of prescribed size held vertically. The criteria shown in Table 2 below must be satisfied in order to have a V-0, V-1, or V-2 flame retardancy.

TABLE 2

|  | V-0 | V-1 | V-2 |
|---|---|---|---|
| burning time for each test specimen | within 10 seconds | within 30 seconds | within 30 seconds |
| total burning time for 5 test specimens | within 50 seconds | within 250 seconds | within 250 seconds |
| cotton ignition by drippings | no | no | yes |

Here, the "burning time" is the length of time for burning with flaming combustion of the test specimen after the ignition source has been removed away. "Cotton ignition by drippings" is determined by whether cotton, used as an indicator and placed approximately 300 mm below the lower end of the test specimen, is ignited by drippings from the test specimen. When even 1 of the 5 test specimens did not satisfy the criteria given above, the evaluation as "Not Rated" (NR) was made for not satisfying V-2.

This is reported as the "flammability" in the tables.

[Evaluation of the Impact Resistance: Charpy Impact Strength (Unit: kJ/m$^2$)]

This was measured using the following procedure in accordance with ISO 179-1 and 179-2.

Using the obtained pellets, a notched impact resistance test specimen with a thickness of 3 mm was formed based on ISO 179-1,2 using an injection molder ("SG75MII" from Sumitomo Heavy Industries, Ltd.) at a cylinder temperature of 280° C., mold temperature of 80° C., and molding cycle of 45 seconds. The notched Charpy impact strength (kJ/m$^2$) was measured at a temperature of 23° C. Here, a larger numerical value indicates a better impact resistance.

This is reported as the "notched Charpy" in the tables.

[Outflow Amount Per Unit Time: Q Value (Unit: ×10$^{-2}$ Cm$^3$/Sec)]

In order to evaluate the fluidity, the pellets obtained by the aforementioned production method were dried for at least 4 hours at 120° C., after which the Q value (unit: ×10$^{-2}$ cm$^3$/sec)—the outflow amount of the composition per unit time—was measured under a load of 160 kgf at temperatures of 280° C. and 300° C. and the difference between the Q values at 300° C. and 280° C., i.e., $\Delta Q = Q(300°\,C.) - Q(280°\,C.)$, was also determined. A diameter 1 mm×length 10 mm orifice was used. A smaller $\Delta Q$ indicates a better thermal stability.

The following are reported in the tables: "Q value (280° C.)", "Q value (300° C.)", and "ΔQ (300° C.−280° C.)".

The results of these evaluations are given in Tables 3 and 4.

TABLE 3

| component | code | Examples | | | | | | |
|---|---|---|---|---|---|---|---|---|
|  |  | 1 | 2 | 3 | 4 | 5 | 6 | 7 |
| polycarbonate resin (A) | A1 | 59.16 | 59.16 | 59.16 | 59.16 | 59.16 | 59.16 | 59.16 |
|  | A2 | 40.84 | 40.84 | 40.84 | 40.84 | 41.87 | 40.84 | 40.84 |
| metal sulfonate salt (B) | B | 0.08 | 0.08 | 0.08 | 0.08 | 0.08 | 0.08 | 0.08 |
| core/shell graft copolymer (C) | C1 | 2.06 | 2.06 | 2.06 | 2.06 | 1.03 |  |  |
|  | C2 |  |  |  |  |  | 2.06 |  |
|  | C3 |  |  |  |  |  |  | 2.06 |
|  | C4 |  |  |  |  |  |  |  |
|  | C5 |  |  |  |  |  |  |  |
| metal salt of organophosphate ester (D) | D | 0.003 | 0.005 | 0.010 | 0.031 | 0.005 | 0.005 | 0.005 |
| fluoropolymer | E | 0.41 | 0.41 | 0.41 | 0.41 | 0.41 | 0.41 | 0.41 |
| stabilizer | F1 | 0.05 | 0.05 | 0.05 | 0.05 | 0.05 | 0.05 | 0.05 |
|  | F2 | 0.10 | 0.10 | 0.10 | 0.10 | 0.10 | 0.10 | 0.10 |
| mold releasing agent | G1 | 0.08 | 0.08 | 0.08 | 0.08 | 0.08 | 0.08 | 0.08 |
|  | G2 | 0.08 | 0.08 | 0.08 | 0.08 | 0.08 | 0.08 | 0.08 |
| mass parts of metal salt of organophosphate ester (D) per 100 mass parts of copolymer (C) |  | 0.15 | 0.25 | 0.5 | 1.5 | 0.5 | 0.25 | 0.25 |
| Q value (280° C., × 10$^{-2}$ cm$^3$/sec) |  | 15.9 | 15.3 | 15.3 | 16.0 | 15.6 | 15.1 | 14.9 |
| Q value (300° C., × 10$^{-2}$ cm$^3$/sec) |  | 32.2 | 30.7 | 30.9 | 31.9 | 32.5 | 31.9 | 31.1 |
| ΔQ (300° C.−280° C.) |  | 16.3 | 15.4 | 15.6 | 15.9 | 16.9 | 16.8 | 16.2 |
| flammability (1.1 mmt) |  | V-0 | V-0 | V-0 | V-0 | V-0 | V-0 | V-0 |
| notched Charpy (3 mmt, kJ/m$^2$) |  | 56 | 57 | 58 | 57 | 50 | 58 | 58 |

TABLE 4

| component | code | Comparative Examples | | | | |
|---|---|---|---|---|---|---|
|  |  | 1 | 2 | 3 | 4 | 5 |
| polycarbonate resin (A) | A1 | 59.16 | 59.16 | 59.16 | 59.16 | 59.16 |
|  | A2 | 40.84 | 40.84 | 40.84 | 40.84 | 40.84 |
| metal sulfonate salt (B) | B | 0.08 | 0.08 | 0.08 | 0.08 | 0.08 |
| core/shell graft copolymer (C) | C1 | 2.06 |  |  | 2.06 | 2.06 |
|  | C2 |  |  |  |  |  |
|  | C3 |  |  |  |  |  |
|  | C4 |  |  | 2.06 |  |  |
|  | C5 |  |  |  |  |  |
| metal salt of organophosphate ester (D) | D |  |  |  | 0.001 | 0.103 |
| fluoropolymer | E | 0.41 | 0.41 | 0.41 | 0.41 | 0.41 |
| stabilizer | F1 | 0.05 | 0.05 | 0.05 | 0.05 | 0.05 |
|  | F2 | 0.10 | 0.10 | 0.10 | 0.10 | 0.10 |

TABLE 4-continued

| component | code | Comparative Examples | | | | |
|---|---|---|---|---|---|---|
| | | 1 | 2 | 3 | 4 | 5 |
| mold releasing | G1 | 0.08 | 0.08 | 0.08 | 0.08 | 0.08 |
| agent | G2 | 0.08 | 0.08 | 0.08 | 0.08 | 0.08 |
| mass parts of metal salt of organophosphate ester (D) per 100 mass parts of copolymer (C) | | | | | 0.05 | 5 |
| Q value (280° C., × $10^{-2}$ cm³/sec) | | 18.9 | 15.4 | 15.7 | 18.2 | 19.2 |
| Q value (300° C., × $10^{-2}$ cm³/sec) | | 39.4 | 30.5 | 30.9 | 38.5 | 40.1 |
| ΔQ (300° C.-280° C.) | | 20.5 | 15.1 | 15.2 | 20.3 | 20.9 |
| flammability (1.1 mmt) | | V-0 | V-1 | V-1 | V-0 | V-0 |
| notched Charpy (3 mmt, kJ/m²) | | 52 | 56 | 56 | 52 | 53 |

INDUSTRIAL APPLICABILITY

The polycarbonate resin composition of the present invention is a polycarbonate resin material that exhibits a high flame retardancy, an excellent impact resistance, and an excellent thermal stability and can therefore be broadly advantageously used for parts, for example, for electric and electronic equipment, office automation equipment, information terminal equipments, and household appliances, and thus has a very high industrial applicability.

The invention claimed is:

1. A polycarbonate resin composition, comprising,
(A) a polycarbonate resin;
0.001 to 1 mass part of (B) a metal organosulfonate salt per 100 mass parts of the polycarbonate resin (A);
0.5 to 5 mass parts of (C) a core/shell graft copolymer per 100 mass parts of the polycarbonate resin (A), where the core/shell graft copolymer has an Si content of at least 300 ppm and a butadienic rubber component for the core; and
0.1 to 3 mass parts of (D) a metal salt of an organophosphate ester per 100 mass parts of the core/shell graft copolymer (C).

2. The polycarbonate resin composition according to claim 1, wherein the metal organosulfonate salt (B) is an alkali metal salt of a perfluoroalkanesulfonic acid or an alkali metal salt of an aromatic sulfonic acid.

3. The polycarbonate resin composition according to claim 1, wherein the core/shell graft copolymer (C) is a graft copolymer obtained by graft polymerizing an alkyl (meth) acrylate on a butadienic rubber.

4. The polycarbonate resin composition according to claim 1, wherein the Si content of the core/shell graft copolymer (C) is at least 1,000 ppm.

5. The polycarbonate resin composition according to claim 1, wherein the Si content of the core/shell graft copolymer (C) is 1,000 to 10,000 ppm.

6. A molded article obtained by molding the polycarbonate resin composition according to claim 1.

* * * * *